(12) United States Patent
Foose et al.

(10) Patent No.: US 7,980,817 B2
(45) Date of Patent: Jul. 19, 2011

(54) GAS TURBINE ENGINE VANE

(75) Inventors: Andrew S. Foose, Vernon, CT (US); Jennifer L. Grudnoski, Plainville, CT (US)

(73) Assignee: United Technologies Corporation, Hartford, CT (US)

( * ) Notice: Subject to any disclaimer, the term of this patent is extended or adjusted under 35 U.S.C. 154(b) by 1126 days.

(21) Appl. No.: 11/787,491

(22) Filed: Apr. 16, 2007

(65) Prior Publication Data

US 2008/0253885 A1 Oct. 16, 2008

(51) Int. Cl.
*F03B 3/16* (2006.01)
(52) U.S. Cl. .............. 415/191; 415/200; 415/211.2; 416/229 R
(58) Field of Classification Search .......... 415/191, 415/211.2, 200, 209.3; 416/229 R, 224, 416/233; 181/213, 219, 292
See application file for complete search history.

(56) References Cited

U.S. PATENT DOCUMENTS

| | | | |
|---|---|---|---|
| 994,166 A * | 6/1911 | Kienast | 416/233 |
| 2,698,666 A * | 1/1955 | Camping et al. | 416/233 |
| 3,166,295 A * | 1/1965 | Szewalski et al. | 416/179 |
| 3,606,580 A * | 9/1971 | Kaufman | 416/232 |
| 3,736,638 A * | 6/1973 | Stone, Jr. | 29/889.72 |
| 3,810,286 A * | 5/1974 | Kaufman, Sr. | 29/889.72 |
| 3,948,346 A * | 4/1976 | Schindler | 181/286 |
| 4,254,171 A * | 3/1981 | Beggs et al. | 428/116 |
| 4,291,080 A * | 9/1981 | Ely et al. | 428/116 |
| 4,294,329 A * | 10/1981 | Rose et al. | 181/222 |
| 4,318,453 A * | 3/1982 | Rose et al. | 181/292 |
| 4,433,021 A * | 2/1984 | Riel | 428/116 |
| 4,465,725 A * | 8/1984 | Riel | 428/116 |
| 4,539,244 A * | 9/1985 | Beggs et al. | 428/116 |
| 4,594,761 A * | 6/1986 | Murphy et al. | 29/889.71 |
| 4,671,841 A * | 6/1987 | Stephens | 156/292 |
| 4,971,521 A * | 11/1990 | Atarashi et al. | 416/233 |
| 5,041,323 A * | 8/1991 | Rose et al. | 428/116 |
| 5,222,360 A | 6/1993 | Antuna et al. | |
| 5,725,355 A * | 3/1998 | Crall et al. | 416/229 A |
| 5,873,699 A * | 2/1999 | Watson et al. | 415/200 |
| 6,420,509 B1 | 7/2002 | Putnam et al. | |
| 6,554,564 B1 | 4/2003 | Lord | |
| 6,619,917 B2 | 9/2003 | Glover et al. | |
| 6,672,833 B2 | 1/2004 | MacLean et al. | |
| 6,764,276 B2 | 7/2004 | Mulcaire et al. | |
| 6,884,507 B2 | 4/2005 | Lin et al. | |
| 7,156,622 B2 * | 1/2007 | Schreiber | 416/224 |
| 7,189,064 B2 * | 3/2007 | Helder et al. | 416/232 |
| 7,487,901 B2 * | 2/2009 | Talwar et al. | 228/112.1 |
| 2002/0012587 A1 * | 1/2002 | Farrar et al. | 415/220 |
| 2004/0184921 A1 * | 9/2004 | Schreiber | 416/229 R |
| 2005/0047918 A1 * | 3/2005 | Powell | 416/233 |
| 2005/0254955 A1 * | 11/2005 | Helder et al. | 416/233 |
| 2006/0024154 A1 * | 2/2006 | Costa et al. | 415/170.1 |
| 2007/0272483 A1 * | 11/2007 | Morin et al. | 181/292 |

\* cited by examiner

*Primary Examiner* — Ninh H Nguyen
*Assistant Examiner* — Aaron R Eastman
(74) *Attorney, Agent, or Firm* — Bachman & LaPointe, P.C.

(57) ABSTRACT

A gas turbine engine vane has first and second members. The first member has a first surface section forming a suction side of an airfoil of the vane. The second surface section forms leading and trailing portions of a pressure side of the airfoil. The third surface section forms a recess between the leading and trailing portions. The second member is secured to the first member and has a first surface section forming an intermediate portion of the pressure side a leading protrusion of the second member may be captured by a recess below a lip of the first member.

24 Claims, 4 Drawing Sheets

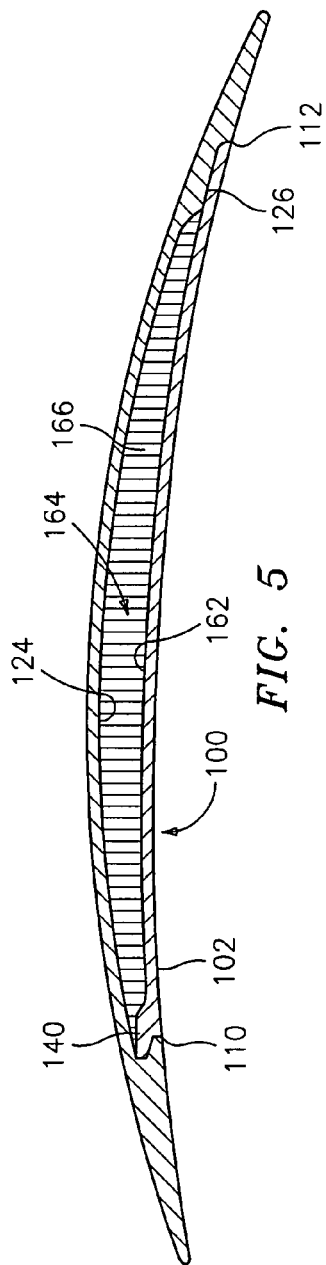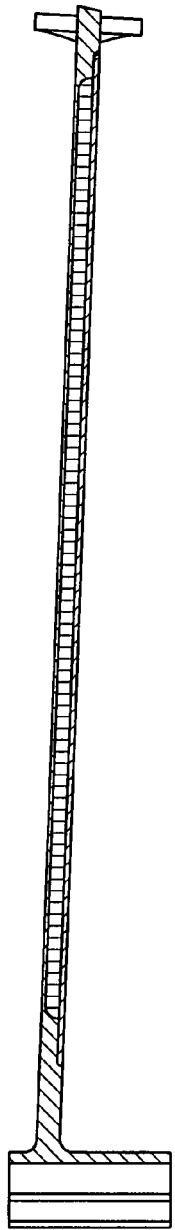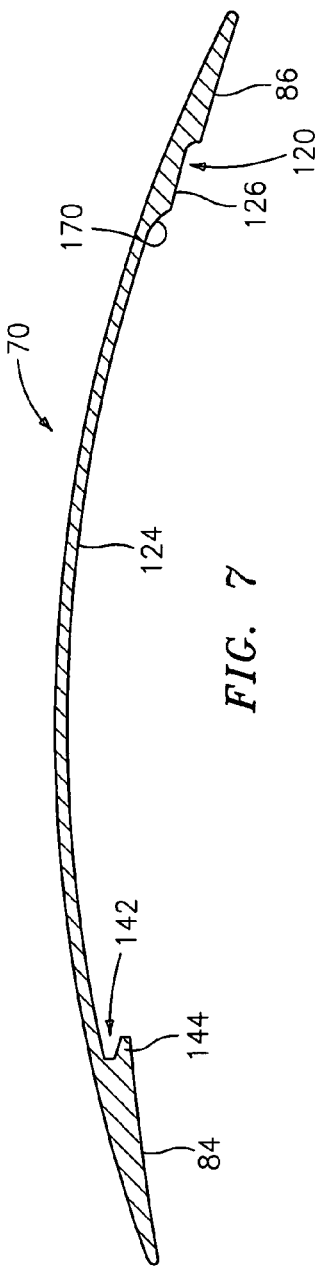

_US 7,980,817 B2_

GAS TURBINE ENGINE VANE

BACKGROUND

The disclosure relates to gas turbine engines. More particularly, the disclosure relates to gas turbine engine fan exit guide vanes.

In several configuration of turbofan engines, a circumferential array of fan exit guide vanes (FEGV) span the bypass flowpath to connect an inner case to an outer case or duct. Several FEGVs are shown U.S. Pat. Nos. 5,873,699, 6,554,564, and 6,619,917 and U.S. Patent Application Publication 2005/0254955.

SUMMARY

Accordingly, one aspect of the disclosure involves a gas turbine engine vane having first and second members. The first member has a first surface section forming a suction side of an airfoil of the vane. The second surface section forms leading and trailing portions of a pressure side of the airfoil. The third surface section forms a recess between the leading and trailing portions. The second member is secured to the first member and has a first surface section forming an intermediate portion of the pressure side. a leading protrusion of the second member may be captured by a recess below a lip of the first member.

In various implementations, a core may be positioned in a space between the first and second members. The core may have a bulk density less than a material density of at least the first member. There may be a circumferential array of the vanes. The array may be circumscribed by a duct. The array may hold the duct to surround a fan of a gas turbine engine.

The details of one or more embodiments are set forth in the accompanying drawings and the description below.

BRIEF DESCRIPTION OF THE DRAWINGS

FIG. 5 is a partial streamwise sectional view of the vane of FIG. 2 taken along line 5-5.

FIG. 6 is a spanwise sectional view of the vane of FIG. 2 taken along line 6-6.

FIG. 7 is a partial streamwise sectional view of the piece of FIG. 4 taken along line 7-7.

Like reference numbers and designations in the various drawings indicate like elements.

DETAILED DESCRIPTION

Figure 1:
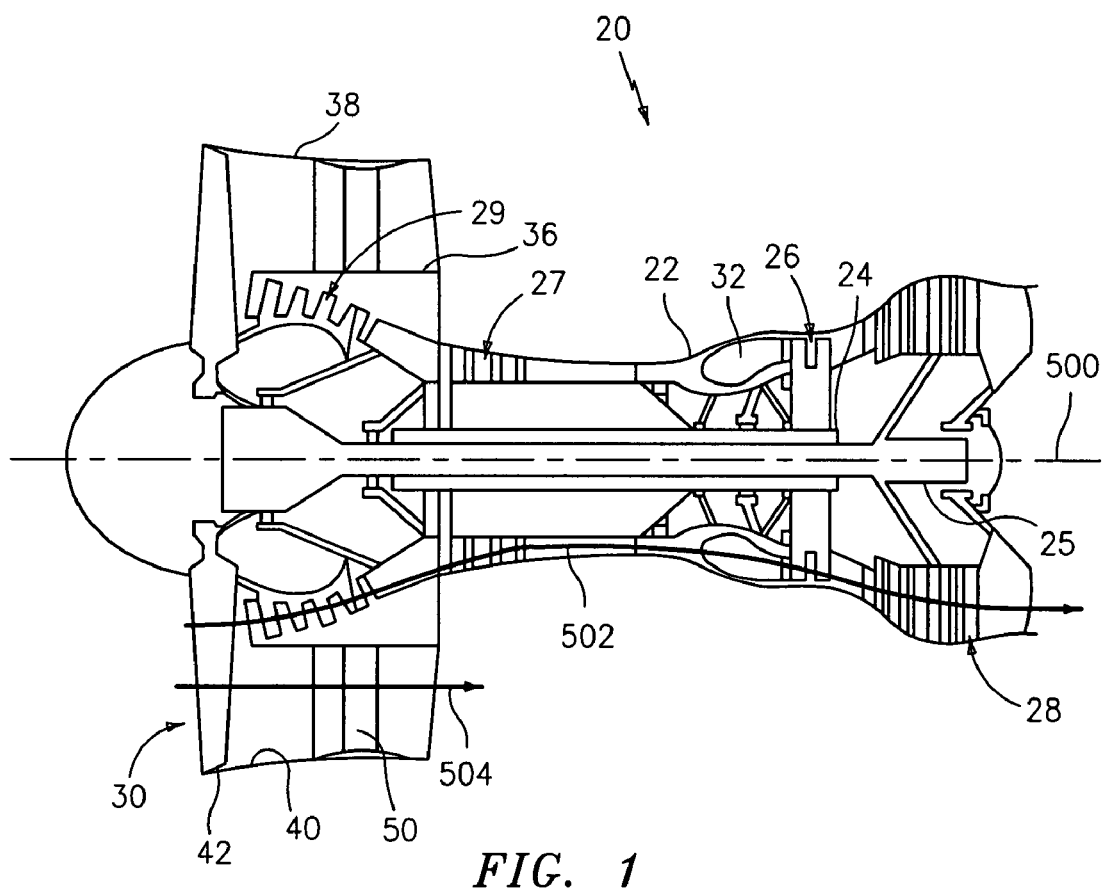
FIG. 1 is a partially schematic longitudinal sectional view of an exemplary gas turbine engine.

FIG. 1 shows a gas turbine engine 20 having a case assembly 22 containing concentric high and low pressure rotor shafts 24 and 25. The shafts are mounted within the case for rotation about an axis 500 which is normally coincident with central longitudinal axes of the case and shafts. The high speed pressure rotor shaft 24 is driven by the blades of a high speed/pressure turbine (HPT) section 26 to in turn drive the blades of a high speed/pressure compressor (HPC) 27. The low speed/pressure rotor shaft 25 is driven by the blades of a low speed/pressure turbine (LPT) section 28 to in turn drive the blades of a low speed/pressure compressor (LPC) section 29 and a fan 30. Air passes through the engine along a core flowpath 502 sequentially compressed by the low and high compressor sections 29 and 27, then passing through a combustor 32 wherein a portion of the air is combusted along with a fuel, and then passing through the high and low turbine sections 26 and 28 where work is extracted. Additional air is driven by the fan along a bypass flowpath 504. The bypass flowpath extends between an inner case 36 (sometimes identified as an intermediate case) and an outer case or duct 38. A leading portion of the exemplary duct 38 surrounds the fan 30. An inboard surface 40 of the duct 38 is closely spaced apart from fan blade tips 42. To support and hold the duct 38, a circumferential array of fan exit guide vanes (FEGV) 50 connect the inner case 36 to the duct 38.

Figure 3:
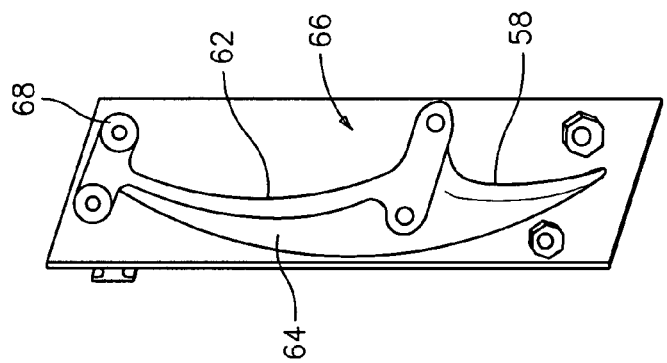
FIG. 3 is an outer diameter (OD) view of the vane of FIG. 2.
Figure 2:
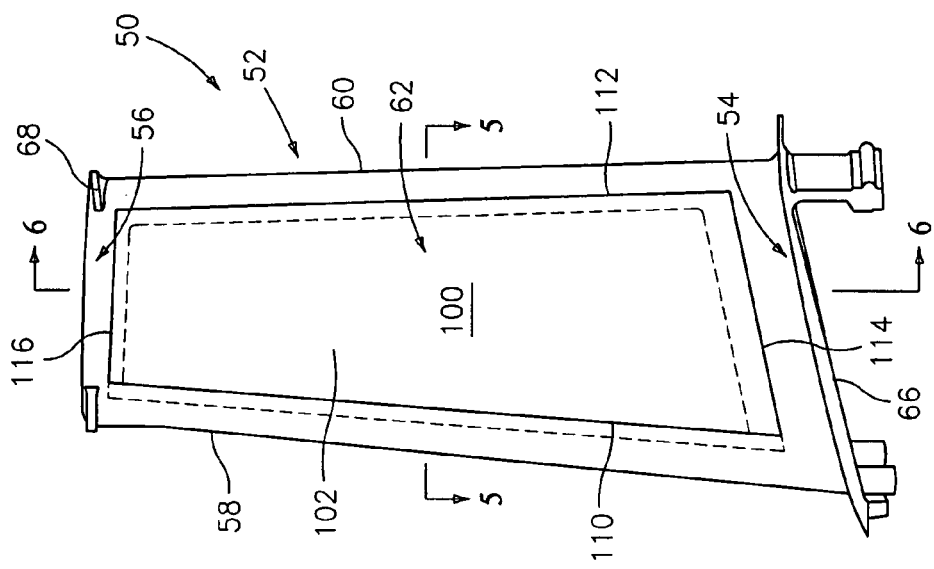
FIG. 2 is a pressure side view of an exit guide vane of the engine of FIG. 1.

FIG. 2 shows an exemplary vane 50. The vane 50 has an airfoil 52 extending along a span from an inboard end 54 to an outboard end 56. The airfoil has a leading edge 58, a trailing edge 60, a pressure side 62, and a suction side 64 (FIG. 3). In the exemplary airfoil, the inboard end may be at an inboard mounting feature such as a platform section 66 and the outboard end may be at an outboard mounting feature, such as ears/lugs 68.

Figure 4:
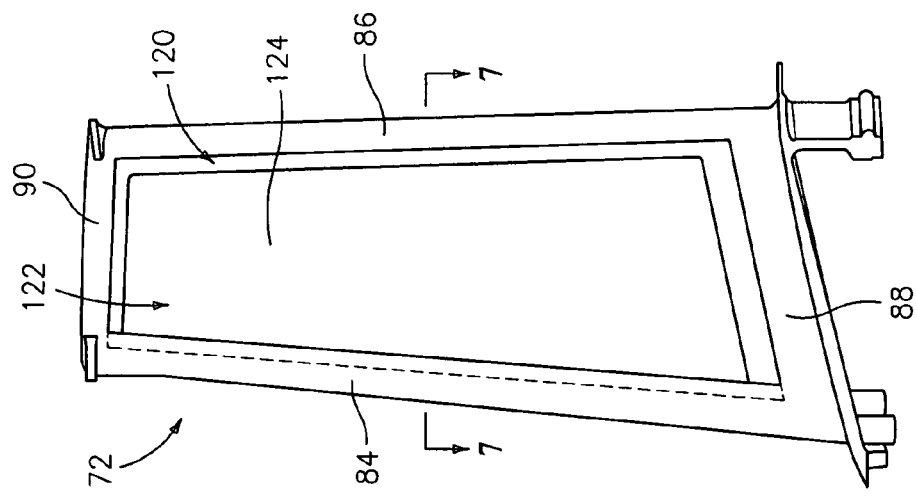
FIG. 4 is a is a pressure side view of a main piece of the exit guide vane of FIG. 2

In the exemplary vane, the inboard and outboard ends and a first portion 70 (FIG. 7) of the airfoil are formed from a first member (e.g., a first metal piece) 72 (FIG. 4). The first member may be formed by forging (e.g., of a titanium alloy such as TI-6A1-4V or an aluminum alloy) or casting. The exemplary first portion 70 of the airfoil extends along the entirety of the suction side 64 and along portions of the pressure side 62. These exemplary portions of the pressure side 62 include (FIG. 4): a leading portion 84, a trailing portion 86, an inboard portion 88, and an outboard portion 90 to define a perimeter of the pressure side. A central portion of the pressure side is formed at least partially by a second member (e.g., a second piece which may be formed as a panel) 100 (FIG. 2). Along the pressure side, the second member 100 includes has an exterior surface 102 forming a remainder of the airfoil pressure side. The exterior surface 102 has a leading boundary 110, a trailing boundary 112, an inboard boundary 114, and an outboard boundary 116. Along the trailing boundary 112, the inboard boundary 114, and the outboard boundary 116, the second member is accommodated in a rebate 120 (FIG. 7) in the first member. The exemplary rebate 120 is formed by a perimeter shoulder of a well 122. The well 122 has a base surface 124 recessed below a shoulder surface 126. The interior surface of the second member may be secured to the shoulder surface 126.

In the exemplary vane, along the leading boundary 110 of the second member, the connection between the members may differ. The exemplary configuration includes an upstream protrusion 140 (FIG. 5) of the second member 100 captured in a recess or undercut 142 (FIG. 7) beneath a downstream-projecting lip portion 144 of the first member. The exemplary protrusion protrudes forward/upstream of the boundary 110 and is recessed below the exterior surface 102.

The exemplary second member 100 includes an interior surface 162 spaced apart from the well base surface 124 to define a compartment 164. An exemplary median compartment depth between the surfaces 124 and 162 is about 7-40 mm; an exemplary maximum/peak depth is 10-50 mm. The compartment may be filled by a core 166. As is discussed below, if present, the core 166 may be pre-installed or formed in situ. The second member 100 may be metallic or non-metallic. Exemplary metallic second member materials include aluminum and aluminum alloys. These may be cast and/or machined. Exemplary non-metallic second member materials include polyimide thermoplastic resin such as amorphous polyetherimide resin marketed under the trademark ULTEM by General Electric Co., Pittsfield, Mass. Other non-metallic second member materials include composites such as fiberglass-epoxy composites. A perimeter portion of the second member interior surface 162 may be bonded to the surface of the rebate 120. The exemplary bonding is adhesive bonding such as with epoxy.

Exemplary cores have a bulk density (e.g., an average including voids) lower than the material density of the first member. For example, the core bulk density may be less than 10% of the first member material density. The core material density may also be less than the first member material density. Exemplary cores are metallic (e.g., aluminum alloy honeycomb) or non-metallic (e.g., NOMEX honeycomb (trademark of E.I. du Pont de Nemours and Company)).

In an exemplary sequence of assembly, the core is preshaped and inserted into the well 122. If used, an adhesive may have been pre-applied to secure the core (e.g., across substantially the entirety of the base surface 124 or along only a perimeter portion 170 inboard of the rebate 120). An adhesive may be applied along the shoulder surface 126 of the rebate 120 (and/or along the mating portion of the second member interior surface 162) The adhesive may be more broadly applied to the interior surface 162 if adherence to the core 166 is desired. The adhesive may also be applied to the protrusion 140 and/or recess 142 (to the underside of the lip 144). The protrusion 140 may be inserted into the recess 142 and the panel rotated into its installed condition, the panel may be clamped in place to allow the adhesive to cure. Exemplary panel adhesives are scrim-supported epoxies, RTV adhesives, and polysulfide adhesives. Polysulfide adhesives may be more elastic and otherwise forgiving than alternative epoxies and may provide a more damage-tolerant joint. Exemplary adhesive securing of a honeycomb core to the metal members may be via scrim-supported adhesive.

Figure 8:
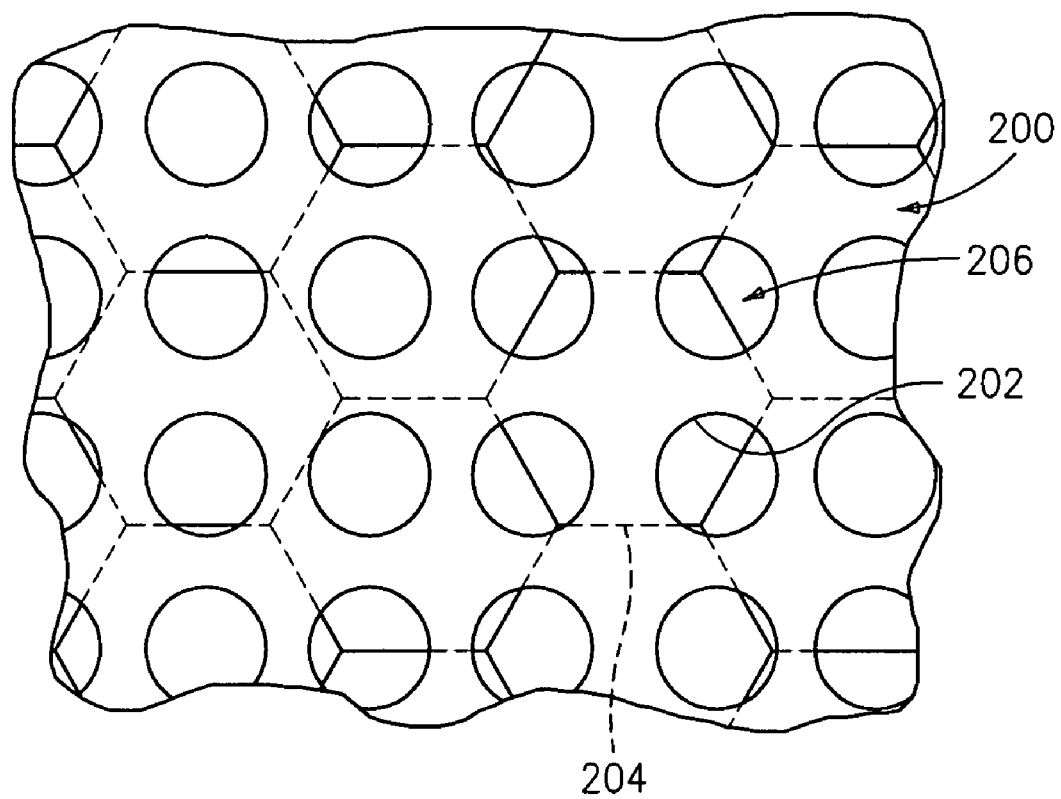
FIG. 8 is a view of a vane panel.

In alternative implementations, the panel may be preformed with one or more apertures (e.g., perforations). If a core is to be in-situ formed, the core material may be introduced through one or more of the apertures. Apertured panels in combination with particular cores may provide acoustic benefits. U.S. Patent Application 20060024154A1, the disclosure of which is incorporated by reference herein, shows a fan case apertured face sheet and honeycomb acoustic liner combination. Such a combination may be used for the panel and core. FIG. 8 shows such a sheet/panel 200 having an array of apertures 202. The honeycomb core 204 is behind the panel. The array may correspond to the honeycomb array or may be different (e.g., a square array). The apertures, however, may be dimensioned and positioned so that each cell 206 of the honeycomb is open to at least one aperture 202. As air flows over the panel 200, the cells may function as Helmholtz resonators, with the apertures serving as resonator ports. The aperture size and distribution may be selected in view of cell size (e.g., volume) to tune the resonators to provide acoustic damping at a target operating condition of the engine. The resonators may be optimized in an iterative process (on actual hardware or a simulation) of altering resonator configuration and determining a response (e.g., acoustic damping) at a predetermined operating condition or range thereof. In such a configuration, the apertures may advantageously be preformed (e.g., to avoid contamination with shavings, etc.). To avoid a need to open holes, an adhesive without scrim support may advantageously be use in the panel-to-core joint.

One or more embodiments have been described. Nevertheless, it will be understood that various modifications may be made. For example, when implemented in the reengineering of an existing vane configuration, or more broadly of an existing engine configuration, details of the existing configuration may influence details of any particular implementation. Accordingly, other embodiments are within the scope of the following claims.

What is claimed is:

1. A gas turbine engine vane comprising:
a first member having:
a first surface section forming a suction side of an airfoil of the vane;
a second surface section forming leading and trailing portions of a pressure side of said airfoil; and
a third surface section forming a well between said leading and trailing portions; and
a second member secured to the first member and having a first surface section forming an intermediate portion of the pressure side,
wherein:
the well comprises a leading recess and a trailing shoulder;
the second member has:
a second surface section generally opposite the second member first surface section and having a first portion secured to the trailing shoulder; and
a leading projection captured by the recess;
the trailing shoulder forms a partial perimeter rebate around the well with the rebate extending along a trailing boundary, an inboard boundary, and an outboard boundary of the well; and
the recess is beneath a downstream-projecting lip portion, the leading projection protruding forward/upstream recessed below the second surface along the first member.

2. The vane of claim 1 wherein:
the first member is adhesive bonded to the second member.

3. The vane of claim 1 wherein:
the first member consists essentially of a titanium alloy; and
the second member comprises at least one of an aluminum alloy and amorphous polyetherimide resin.

4. The vane of claim 1 wherein:
the first member comprises a platform at an inboard end of the airfoil and a mounting lug at an outboard end of the airfoil.

5. The vane of claim 1 wherein:
the second member is foraminate.

6. The vane of claim 1 wherein:
an empty void is between the first member and second member and has a maximum thickness of at least 10 mm.

7. The vane of claim 1 further comprising:
a core positioned in a space between the first member and second member and having a bulk density less than a material density of the first member.

8. The vane of claim 1 further comprising:
a core positioned in a space between the first member and second member and having a material density less than a material density of the first member.

9. The vane of claim 1 further comprising:
a honeycomb core positioned in a space between the first member and second member.

10. The vane of claim 1 further comprising:
a metallic core positioned in a space between the first member and second member.

11. A fan duct assembly comprising:
a circumferential array of vanes of claim 1; and
a duct circumscribing the array.

12. An engine comprising:
at least one compressor section;
a combustor section downstream of the compressor section along a core flowpath;
at least one turbine section downstream of the combustor section along the core flowpath;
a fan; and
the assembly of claim 11, the vanes holding the duct to surround the fan.

13. The engine of claim 12 wherein:
there are first and second spools, the first spool associated with a first of the compressor sections and a first of the turbine sections and the second spool associated with a second of the compressor sections and a second of the turbine sections.

14. A method for manufacturing the gas turbine engine vane of claim 1, the method comprising:
forging the first member of the vane, the forging forming a leading edge of the airfoil, a trailing edge the airfoil, the suction side of the airfoil, portions of the pressure side of the airfoil, and the well in the pressure side; and
securing the second member to the first member to cover the well including mechanically interlocking the second member to the first member along at least one edge of the second member.

15. The method of claim 14 wherein:
the securing comprises adhesive bonding.

16. The method of claim 14 further comprising:
casting the second member.

17. The method of claim 14 further comprising:
installing a filler member into the well.

18. The method of claim 17 wherein:
the installing comprises inserting a pre-formed filler member into the well.

19. The method of claim 17 wherein:
the installing comprises forming in situ.

20. A gas turbine engine vane comprising:
an airfoil having:
  a suction side;
  a pressure side;
  a leading edge; and
  a trailing edge;
a first member having:
  a first surface section forming at least part of one of the suction side and the pressure side; and
  a second surface section forming leading and trailing portions of the other of the suction side and the pressure side; and
a second member secured to the first member and having a first surface section forming an intermediate portion of the other side,
wherein:
  the first member comprises a lip and a shoulder; and
  the second member has:
    a second surface section generally opposite the second member first surface section and having a first portion secured to the shoulder; and
    a projection captured by the lip;
  the shoulder forms a partial perimeter rebate around a well with the rebate extending along a trailing boundary, an inboard boundary, and an outboard boundary of the well; and
  a recess is beneath the lip, the projection protruding forward/upstream recessed below the second surface along the first member.

21. The gas turbine engine vane of claim 20 wherein:
at least one of the pressure side and the suction side includes a plurality of apertures, the apertures cooperating with the core to define a plurality of resonators.

22. The vane of claim 21 wherein:
the core comprises a non-metallic honeycomb.

23. A method for engineering the vane of claim 21 wherein:
determining a target operating condition; and
determining a response of the resonators at the target operating condition.

24. The method of claim 23 wherein:
the determining of the response is part of an iterative process of varying resonator configuration and determining an associated response to provide a resonator configuration; and
the method further comprises manufacturing the vane having said resonator configuration.

* * * * *